United States Patent
Yamaguchi et al.

(10) Patent No.: US 12,139,956 B2
(45) Date of Patent: Nov. 12, 2024

(54) VEHICULAR DOOR DEVICE

(71) Applicant: AISIN CORPORATION, Kariya (JP)

(72) Inventors: Masayoshi Yamaguchi, Kariya (JP); Seiichi Sumiya, Kariya (JP); Yasuaki Nishio, Kariya (JP); Shigeki Naito, Kariya (JP); Katsusuke Araki, Kariya (JP)

(73) Assignee: AISIN CORPORATION, Kariya (JP)

( * ) Notice: Subject to any disclaimer, the term of this patent is extended or adjusted under 35 U.S.C. 154(b) by 271 days.

(21) Appl. No.: 17/651,831

(22) Filed: Feb. 21, 2022

(65) Prior Publication Data

US 2022/0297514 A1    Sep. 22, 2022

(30) Foreign Application Priority Data

Mar. 19, 2021    (JP) .................... 2021-046246

(51) Int. Cl.
*E05F 15/649* (2015.01)
*B60J 5/04* (2006.01)
*B60J 5/06* (2006.01)
*E05F 15/655* (2015.01)

(52) U.S. Cl.
CPC ............ *E05F 15/649* (2015.01); *B60J 5/047* (2013.01); *B60J 5/06* (2013.01); *E05F 15/655* (2015.01); *E05Y 2201/686* (2013.01); *E05Y 2900/531* (2013.01)

(58) Field of Classification Search
CPC . B60J 5/047; B60J 5/06; E05D 15/101; E05F 15/63; E05F 15/649; E05F 15/655
USPC .................................................. 296/146.12
See application file for complete search history.

(56) References Cited

U.S. PATENT DOCUMENTS

| 3,095,600 | A | * | 7/1963 | Bretzner | ................. | E05D 15/28 49/248 |
| 4,650,241 | A | * | 3/1987 | Motonami | .............. | E05D 3/147 49/248 |
| 7,438,346 | B1 | * | 10/2008 | Breed | ................... | E05C 17/203 296/146.12 |
| 7,611,190 | B1 | * | 11/2009 | Elliott | ....................... | B60J 5/06 49/248 |

(Continued)

FOREIGN PATENT DOCUMENTS

| FR | 2726511 A1 * | 5/1996 | ............. B60J 5/047 |
| JP | 59-179974 U | 12/1984 | |
| JP | 2006-090097 A | 4/2006 | |

(Continued)

OTHER PUBLICATIONS

English translation of FR 2726511; retrieved via PatentTranslate loacted at www.epo.org. (Year: 2024).*

(Continued)

*Primary Examiner* — Jason S Daniels
(74) *Attorney, Agent, or Firm* — Oblon, McClelland, Maier & Neustadt, L.L.P.

(57) ABSTRACT

A vehicular door device causes a door to perform an opening-closing operation, based on an operation of a link mechanism formed of first and second link arms. Further, the first link arm is provided with a hand placement portion that rotates integrally with the first link arm. Then, the vehicular door device is configured in such a way that the first link arm supports a load applied to the hand placement portion.

11 Claims, 16 Drawing Sheets

(56) References Cited

U.S. PATENT DOCUMENTS 8,684,445 B2 * 4/2014 Ellinghaus ............ E05D 15/101
296/146.12

FOREIGN PATENT DOCUMENTS

| JP | 2006-328916 A | 12/2006 |
| JP | 2008-163693 A | 7/2008 |

OTHER PUBLICATIONS

U.S. Appl. No. 17/457,284, filed Dec. 2, 2021, Sumiya, S.
U.S. Appl. No. 17/457,288, filed Dec. 2, 2021, Sumiya, S.

* cited by examiner

F I G. 8
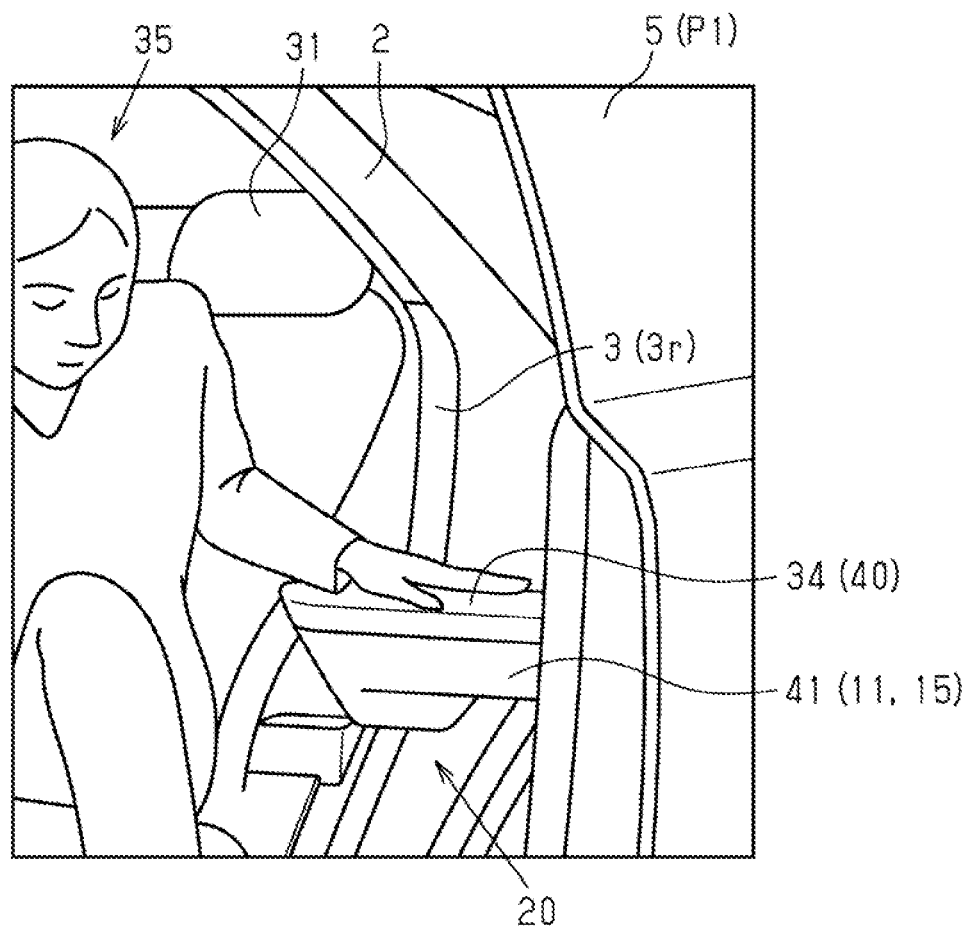

VEHICULAR DOOR DEVICE

CROSS REFERENCE TO RELATED APPLICATIONS

This application is based on and claims priority under 35 U.S.C. § 119 to Japanese Patent Application 2021-046246, filed on Mar. 19, 2021, the entire content of which is incorporated herein by reference.

TECHNICAL FIELD

This disclosure generally relates to a vehicular door device.

BACKGROUND DISCUSSION

There has conventionally been a vehicular door device including a first link arm and a second link arm that have a first rotary coupling point with respect to a vehicle body, and a second rotary coupling point with respect to a door of a vehicle. In such a vehicular door device, the door provided on a door opening performs an opening-closing operation, based on an operation of a link mechanism formed of the first link arm and the second link arm. Moreover, for example, JP2006-90097A (Reference 1) describes a configuration in which each link arm forming the link mechanism is housed on an outer side of a door opening mounted at a terminal portion of a vehicle body side portion, and on an inner side of a weather strip mounted on a vehicular inner side of a door, when the door is in a closed state. Then, for example, JP2008-163693A (Reference 2) discloses a configuration in which a link mechanism formed of each of such link arms is combined with a structure that engages a guide rail on a vehicle body side with a guide roller unit on a door side.

However, in the vehicular door device described above, a link arm forming the link mechanism may protrude from an inner side surface of the door.

A need thus exists for a vehicular door device which is not susceptible to the drawback mentioned above.

SUMMARY

A vehicular door device that solves the problem described above includes a first link arm and a second link arm that include a first rotary coupling point with respect to a vehicle body, and a second rotary coupling point with respect to a door of a vehicle. The door performs an opening-closing operation, based on an operation of a link mechanism formed of the first link arm and the second link arm. The first link arm is provided with a hand placement portion that rotates integrally with the first link arm, and is thereby configured in such a way as to support a load applied to the hand placement portion.

BRIEF DESCRIPTION OF THE DRAWINGS

The foregoing and additional features and characteristics of this disclosure will become more apparent from the following detailed description considered with the reference to the accompanying drawings, wherein:

FIG. 8 is an explanatory view of a passenger who utilizes the handrail portion.

DETAILED DESCRIPTION

Hereinafter, one embodiment of a vehicular door device is described with reference to the drawings.

Figure 1:
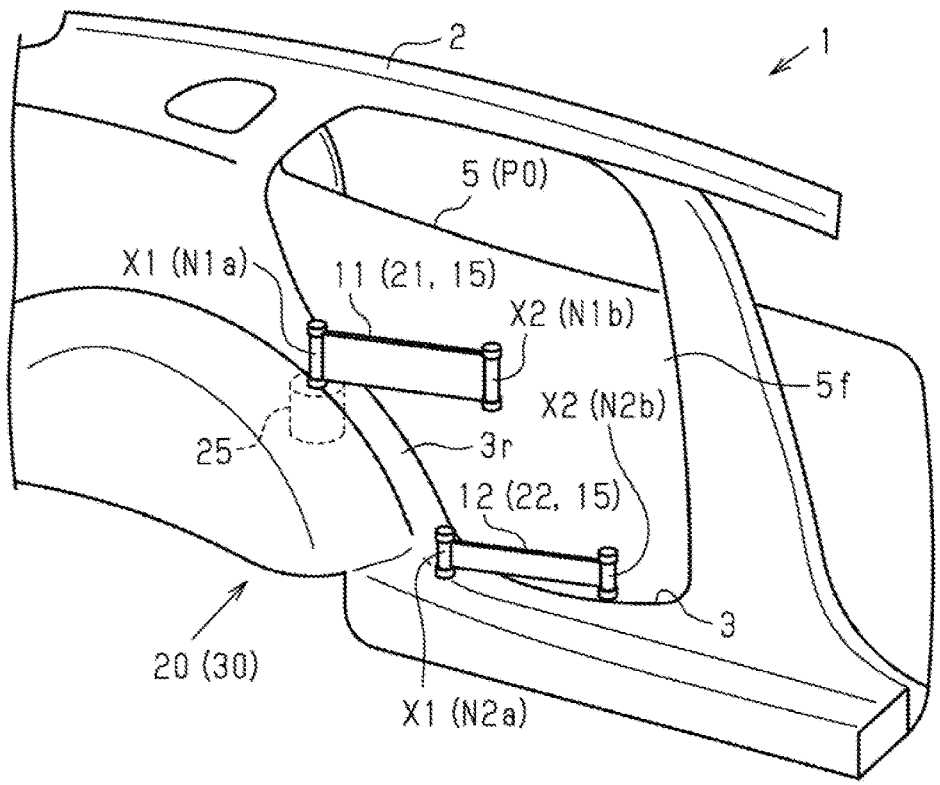
FIG. 1 is a perspective view of a vehicular door device.
Figure 2:
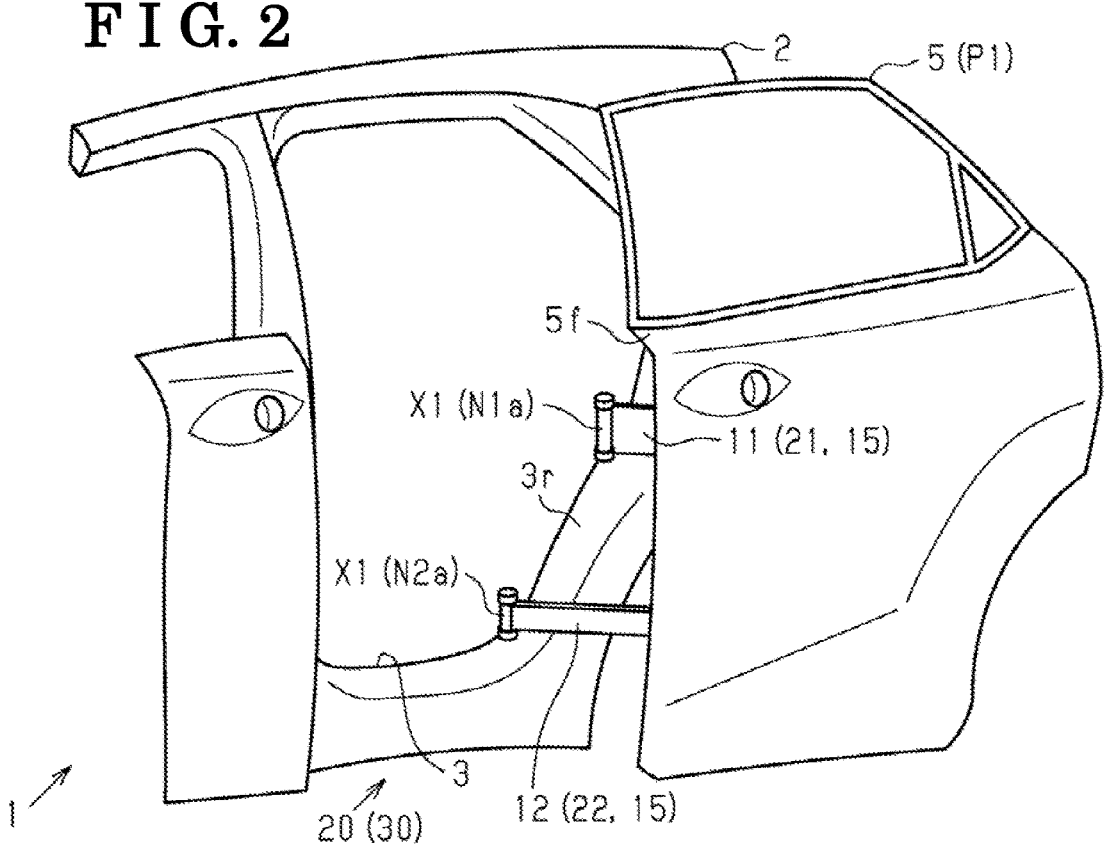
FIG. 2 is a perspective view of the vehicular door device.

As illustrated in FIGS. 1 and 2, a vehicle 1 according to the present embodiment includes a door opening 3 provided in a side surface of a vehicle body 2. Then, the door opening 3 is provided with a first link arm 11 and a second link arm 12 that support a door 5 of the vehicle 1 in the door opening 3.

To describe specifically, in the vehicle 1 according to the present embodiment, the first and second link arms 11 and 12 each include a first rotary coupling point X1 with respect to the vehicle body 2, and a second rotary coupling point X2 with respect to the door 5. To be specific, the first link arm 11 is coupled to the vehicle body 2 in a state of being pivotally supported by a support shaft N1a extending in an up-down direction (in each view, an up-down direction), and coupled to the door 5 in a state of being pivotally supported by a support shaft N1b extending in the up-down direction. Then, the second link arm 12 is also coupled to the vehicle body 2 in a state of being pivotally supported by a support shaft N2a extending in the up-down direction, and coupled to the door 5 in a state of being pivotally supported by a support shaft N2*b* extending in the up-down direction.

Figure 3:
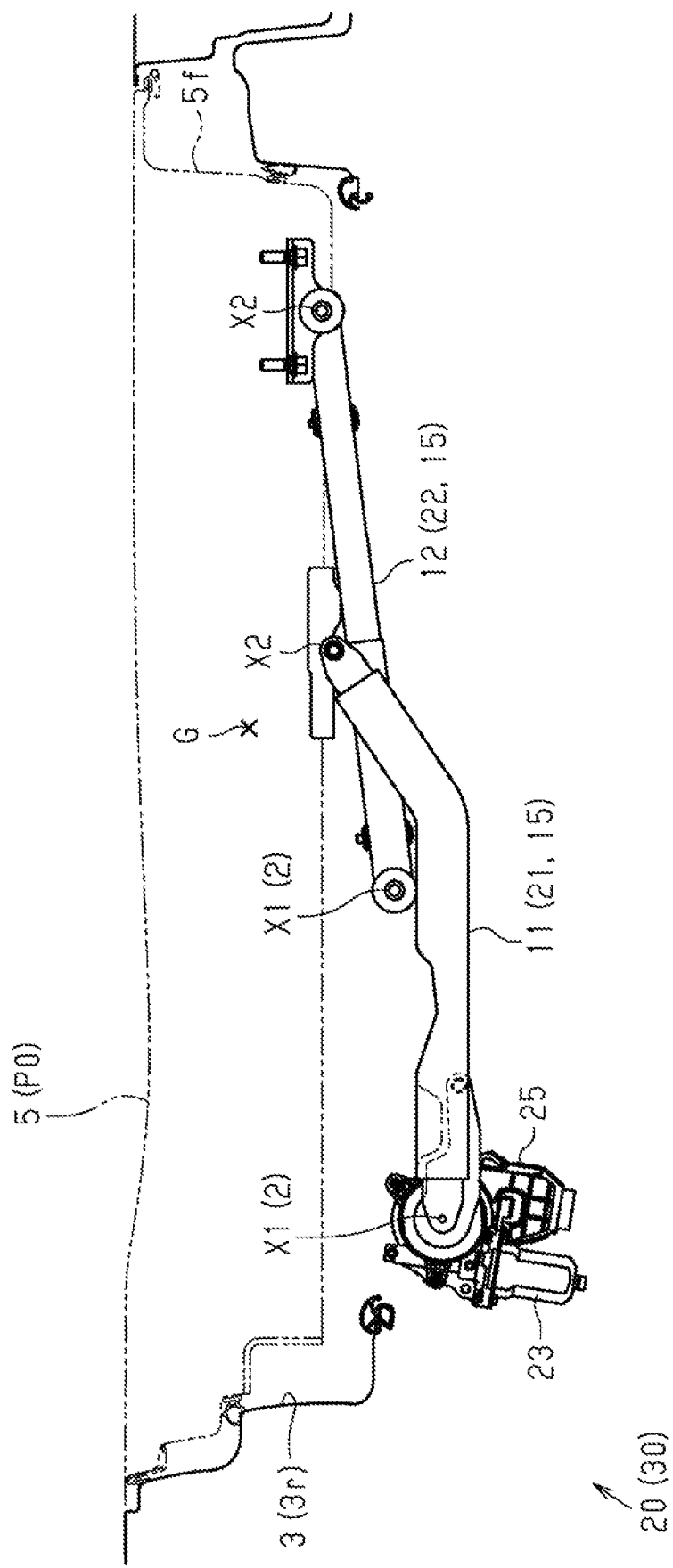
FIG. 3 is a plan view of first and second link arms forming a link mechanism.
Figure 4:
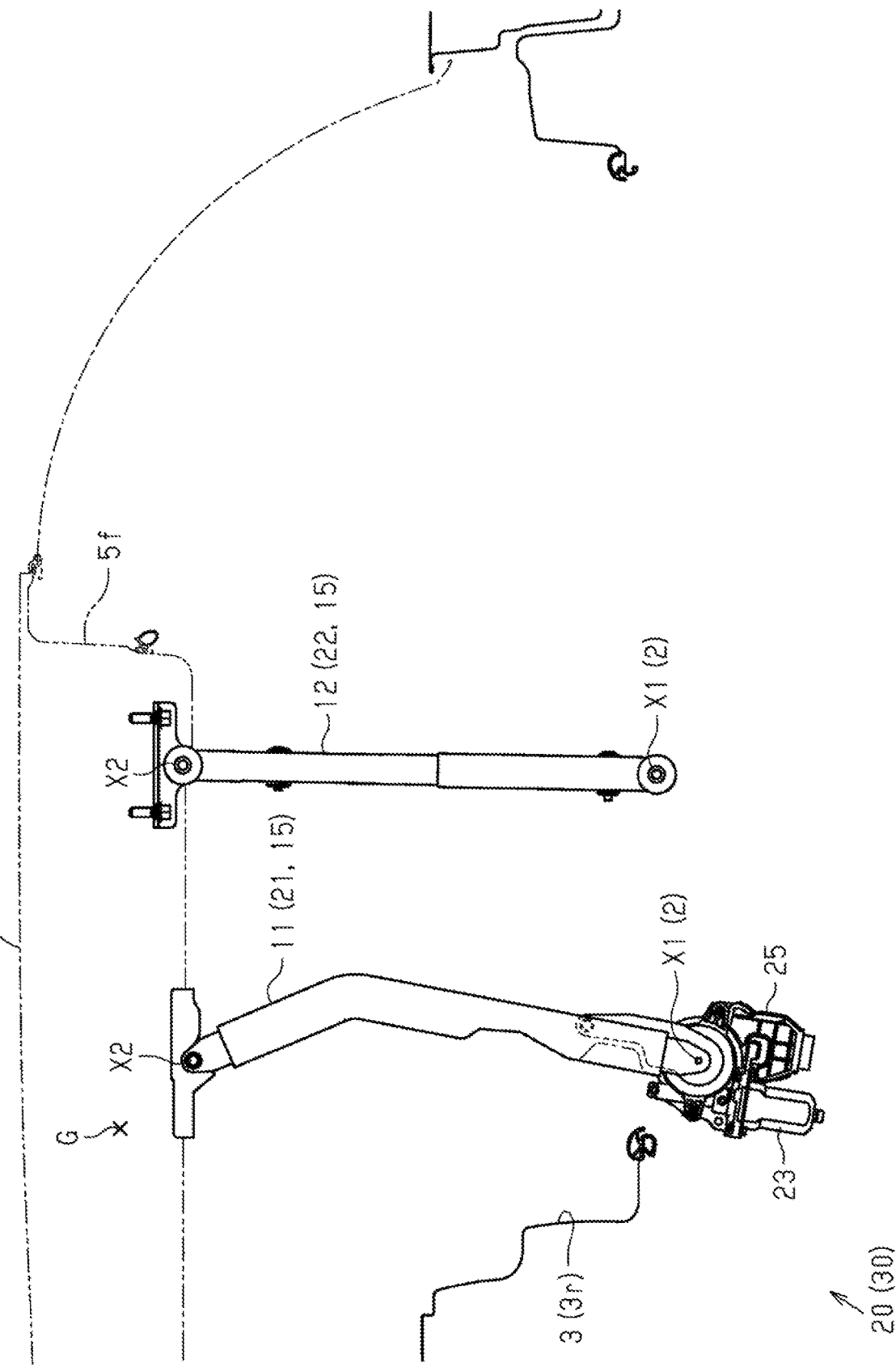
FIG. 4 is a plan view of the first and second link arms forming the link mechanism.
Figure 5:
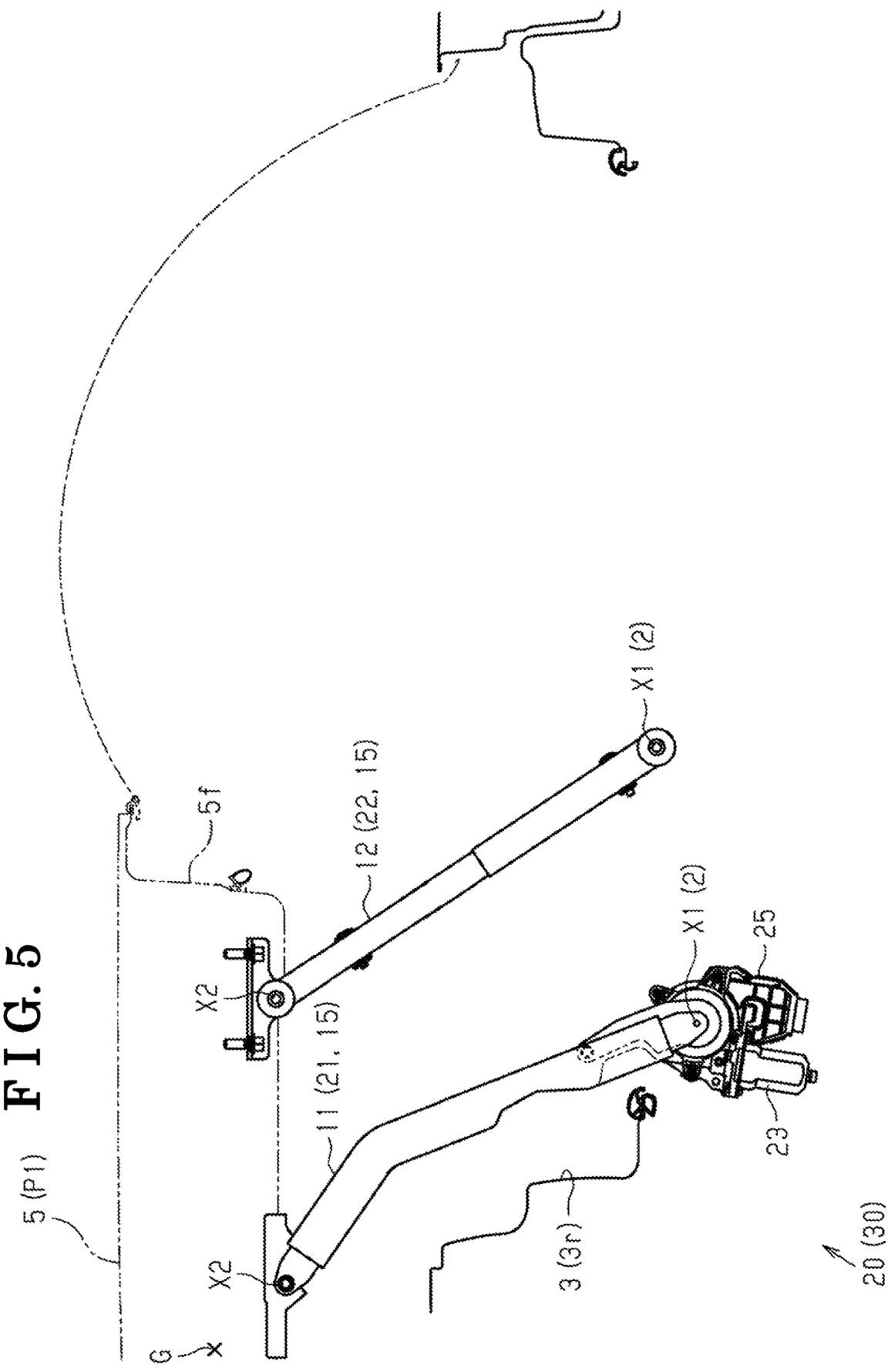
FIG. 5 is a plan view of the first and second link arms forming the link mechanism.

That is to say, as illustrated in FIGS. 3 to 5, in the vehicle 1 according to the present embodiment, the first and second link arms 11 and 12 form a link mechanism 15 having a configuration as a four-bar link. Then, the vehicle 1 according to the present embodiment has a configuration in which the door 5 supported in the door opening 3 performs an opening-closing operation, based on an operation of the link mechanism 15.

To describe more specifically, as illustrated in FIGS. 1 and 2, the vehicle 1 according to the present embodiment supports the door 5 in the door opening 3 on a vehicle rear side (in FIG. 1, a left side, and in FIG. 2, a right side) by use of the first and second link arms 11 and 12. In the vehicle 1 according to the present embodiment, the first and second link arms 11 and 12 each include, at a rear edge 3*r* of the door opening 3, the first rotary coupling point X1 coupled pivotally with respect to the vehicle body 2. Then, in the vehicle 1 according to the present embodiment, the first and second link arms 11 and 12 are disposed away in the up-down direction.

In the vehicle 1 according to the present embodiment, the first link arm 11 is provided higher than the second link arm 12. Moreover, the first link arm 11 includes, at a substantially central position in a front-rear direction of the door 5, the second rotary coupling point X2 coupled rotatably with respect to the door 5. On the other hand, the second link arm 12 includes, in the vicinity of a front end 5*f* of the door 5, the second rotary coupling point X2 coupled to the door 5. Then, in the vehicle 1 according to the present embodiment, a vehicular door device 20 is thereby formed such that the door 5 performs an opening-closing operation, based on an operation of the link mechanism 15 formed of the first and second link arms 11 and 12.

To be specific, as illustrated in FIGS. 3 to 5, in the vehicular door device 20 according to the present embodiment, the first and second link arms 11 and 12 rotate around the first rotary coupling point X1 in a counterclockwise direction in each view, during an opening operation of the door 5. Then, the door 5 of the vehicle 1 supported by the first and second link arms 11 and 12 thereby performs an opening operation to the vehicle rear side (in each diagram, a left side).

Then, in the vehicular door device 20 according to the present embodiment, the first and second link arms 11 and 12 rotate around the first rotary coupling point X1 in a clockwise direction in each view, during a closing operation of the door 5. Then, the door 5 of the vehicle 1 supported by the first and second link arms 11 and 12 is thereby configured to perform a closing operation to the vehicle front side (in each diagram, a right side).

Furthermore, in the vehicular door device 20 according to the present embodiment, an opening-closing operation track of the door 5 is defined based on an operation of the link mechanism 15 formed of the first and second link arms 11 and 12. That is to say, as illustrated in FIG. 4, a movement component in a vehicle front-rear direction becomes great at an intermediate position where the first and second link arms 11 and 12 are in a state of extending in a vehicle width direction (in FIGS. 3 to 5, an up-down direction). Then, as illustrated in FIG. 3, the nearer an opening-closing operation position of the door 5 is to a full closed position P0, the more the first and second link arms 11 and 12 are in a state of extending in a vehicle front-rear direction (in FIGS. 3 to 5, an left-right direction), and thereby a movement component in the vehicle width direction becomes great.

Furthermore, as illustrated in FIGS. 1 to 5, in the vehicular door device 20 according to the present embodiment, the first link arm 11 has the second rotary coupling point X2 coupled to the door 5 at a position nearer a center of gravity G than the second link arm 12. That is to say, in the vehicular door device 20 according to the present embodiment, the first link arm 11 is thereby positioned by a main link 21 supporting a greater door load. Then, the second link arm 12 is positioned by a sub link 22 whose acting door load is relatively small.

Note that, in the vehicular door device 20 according to the present embodiment, the first link arm 11 has a larger diameter than the second link arm 12. Then, the vehicular door device 20 according to the present embodiment thereby has a configuration in which high support rigidity is applied to the first link arm 11 positioned by the main link 21.

Moreover, the vehicular door device 20 according to the present embodiment includes an actuator 25 that rotates and drives the first link arm 11 with a motor 23 as a drive source. In the vehicular door device 20 according to the present embodiment, the actuator 25 is provided at a position below the first link arm 11. To be specific, the actuator 25 is fixed to the vehicle body 2 at a position where an output shaft of the actuator 25 is substantially coaxial with the first rotary coupling point X1. That is to say, the actuator 25 according to the present embodiment drives the link mechanism 15 formed of the first link arm 11 and a second link arm 12 in such a way as to rotate the first link arm 11. Then, the vehicular door device 20 according to the present embodiment thereby has a configuration as a power door device 30 that can cause the door 5 to perform an opening-closing operation, based on drive force of the actuator 25.

(Hand Placement Portion)

Next, a hand placement portion provided in the first link arm 11 in the vehicular door device 20 according to the present embodiment is described.

Figure 6:
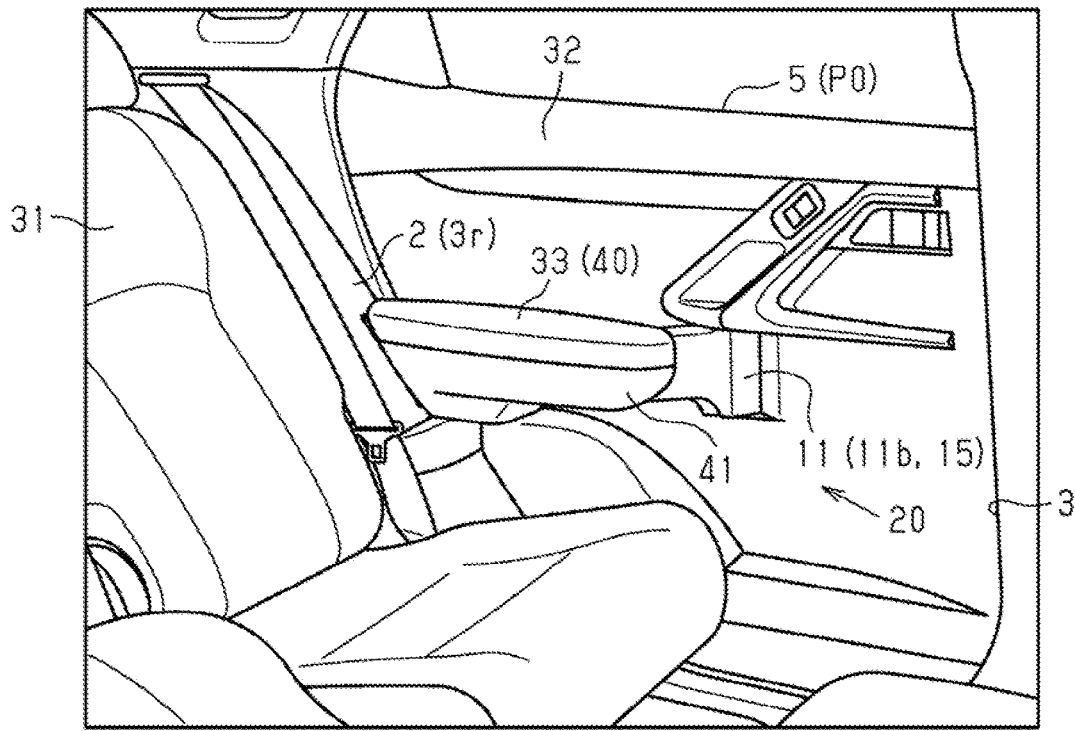
FIG. 6 is a perspective view of a door in a full closed state and an armrest disposed beside a seat.

As illustrated in FIG. 6, in the vehicle 1 according to the present embodiment, the door 5 disposed beside a seat 31 is provided with an armrest 33 extending in a vehicle front-rear direction (in FIG. 6, an left-right direction) along a door trim 32, when the door 5 is in a full closed state. That is to say, the armrest 33 is disposed at a position where a passenger who is seated on the seat 31 can place his/her arm or elbow. Then, the vehicle 1 according to the present embodiment is configured in such a way that the passenger on the seat 31 can take a relaxed seating posture by utilizing the armrest 33.

Figure 7:
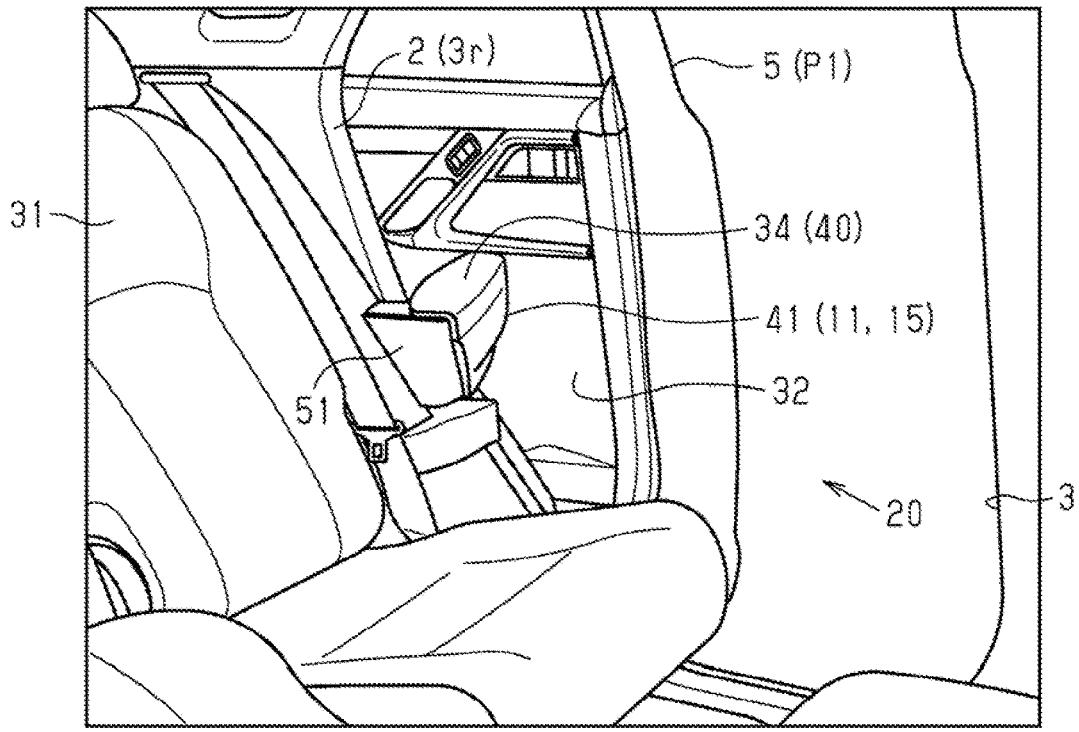
FIG. 7 is a perspective view of the door in a full opened state and a handrail portion extended beside a seat.

Moreover, as illustrated in FIGS. 7 and 8, in the vehicle 1 according to the present embodiment, the door 5 performs an opening operation, and thereby the armrest 33 disposed beside the seat 31 changes into a handrail portion 34 extending in a vehicle width direction (in FIG. 6, a direction orthogonal to a sheet surface). Note that, FIGS. 7 and 8 illustrate a state where the door 5 is at a full opened position P1, i.e., a full opened state. Then, the vehicle 1 according to the present embodiment is configured in such a way that a passenger 35 can easily get on and off by utilizing the handrail portion 34.

To describe specifically, as illustrated in FIGS. 9 to 12, in the vehicle 1 according to the present embodiment, the first link arm 11 configuring the link mechanism 15 of the vehicular door device 20 is provided with a hand placement portion 40 that rotates integrally with the first link arm. Further, the vehicular door device 20 according to the present embodiment has a configuration in which the first link arm 11 positioned by the main link 21 supports a load applied to the hand placement portion 40. Then, in the vehicular door device 20 according to the present embodiment, the hand placement portion 40 provided in the first link arm 11 is thereby configured in such a way as to function as the armrest 33 or the handrail portion 34 as described above, according to an opening-closing operation position of the door 5.

To describe more specifically, the vehicular door device 20 according to the present embodiment includes a first link cover 41 that rotates integrally with the first link arm 11 in a state of covering an outer periphery of the first link arm 11. Then, the hand placement portion 40 according to the present embodiment is provided integrally with the first link cover 41.

Figure 13:
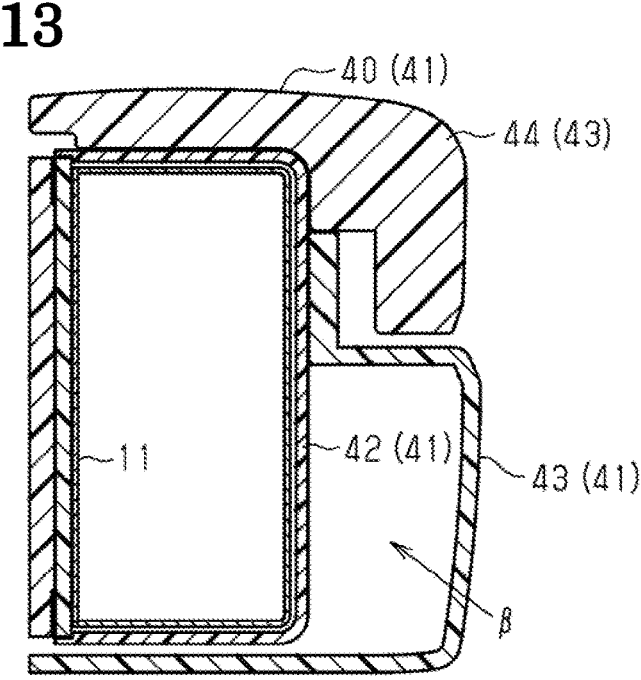
FIG. 13 is a sectional view the first link arm and a first link cover.

To be specific, as illustrated in FIG. 13, in the vehicular door device 20 according to the present embodiment, the first link cover 41 includes an inner cover 42 fixedly attached to the outer periphery of the first link arm 11 having a substantially rectangular sectional shape, and an outer cover 43 covering an outer side of the inner cover 42. Moreover, the inner cover 42 and the outer cover 43 are made by use of a soft material such as resin or a sponge. Further, the inner cover 42 and the outer cover 43 are each assembled on the first link arm 11 in a state of being divided into a plurality of components. Then, the vehicular door device 20 according to the present embodiment has a configuration in which an upper cover 44 disposed above the first link arm 11, among components of the outer cover 43, functions as the hand placement portion 40.

Figure 14:
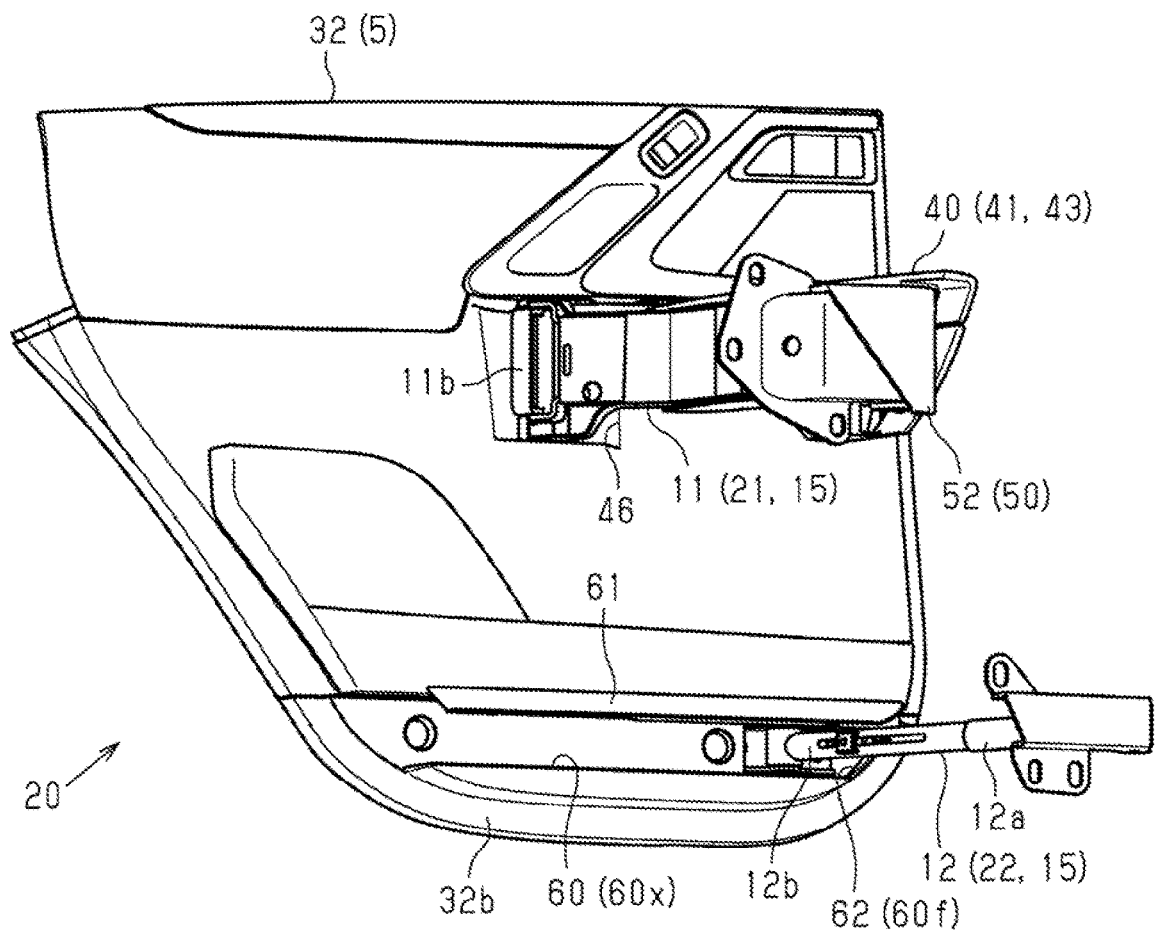
FIG. 14 is a perspective view of the first and second link arms seen from a vehicle room side.
Figure 15:
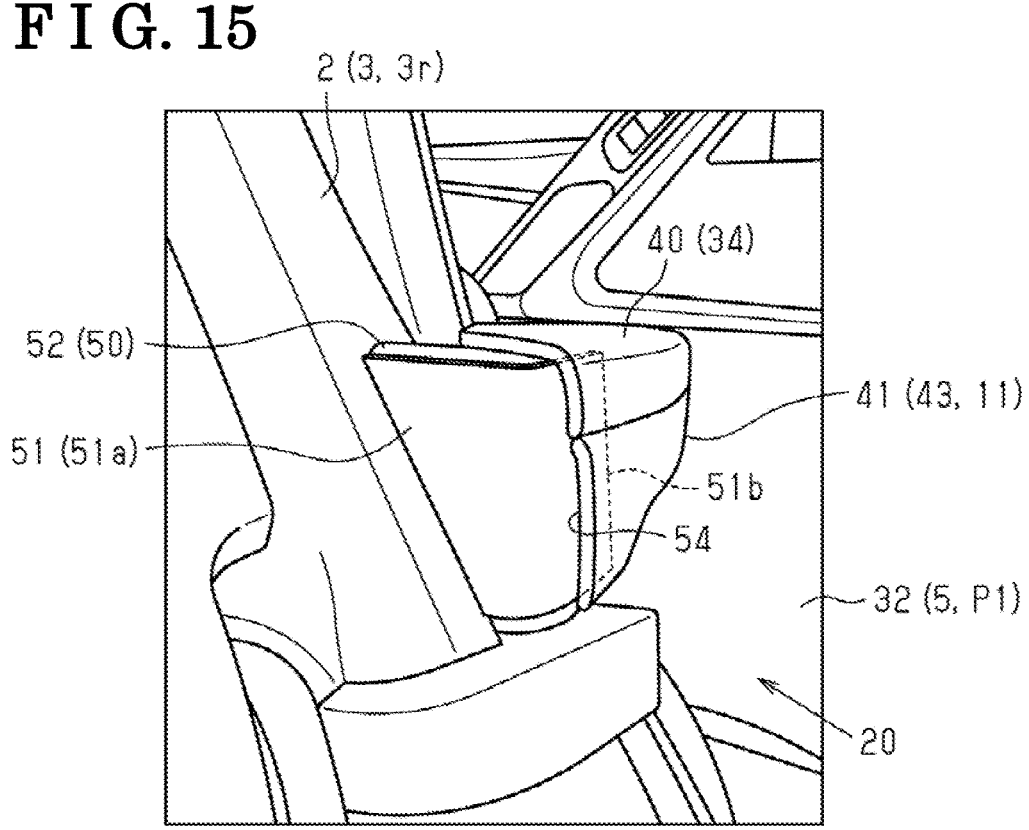
FIG. 15 is a perspective view of a coupling portion cover covering a coupling portion of the first link arm with respect to a vehicle body.
Figure 16:
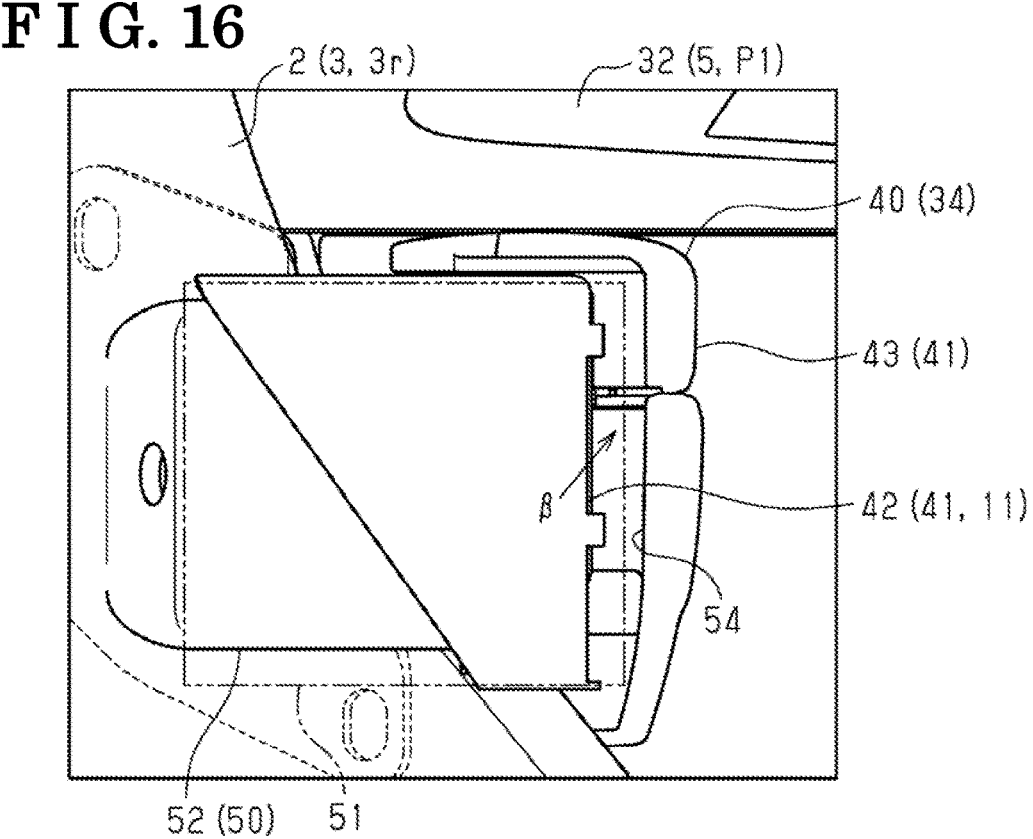
FIG. 16 is a side view illustrating an opening provided in the first link cover into which a free end of the coupling portion cover is inserted.

Moreover, as illustrated in FIG. 14, in the vehicular door device 20 according to the present embodiment, the first link arm 11 is coupled to an inner side surface 5s of the door 5 via a hole portion 46 provided in the door trim 32. Further, regarding the first link cover 41 covering the first link arm 11, a material of the outer cover 43 configuring an envelope of the hand placement portion 40 is selected in such a way as to harmonize with the door trim 32. Then, in the vehicular door device 20 according to the present embodiment, integrality of the armrest 33 and the handrail portion 34 disposed beside the door 5 with the door trim 32 is thereby increased.

Furthermore, as illustrated in FIGS. 9 to 12, in the vehicular door device 20 according to the present embodiment, the first link arm 11 has a bent shape in which a tip part coupled to the door 5 is curved. To be specific, the first link arm 11 has, in a tip portion 11b coupled to the door 5, a bent portion 47 extending and curving toward an outer side (in FIG. 12, an upper side) in a vehicle width direction when the door 5 is in a full opened state. Moreover, the hand placement portion 40 is provided in a body portion 48 of the first link arm 11 extending substantially straight from a coupling portion to the vehicle body 2. Further, in the vehicular door device 20 according to the present embodiment, the first link arm 11 has the body portion 48 disposed substantially in parallel with the inner side surface 5s of the door 5 when the door 5 is in a full closed state. Then, the vehicular door device 20 according to the present embodiment is thereby configured in such a way that a clearance $\alpha$ is formed between the door trim 32 and the first link arm 11 when the door 5 is in a full closed state including the armrest 33 formed by the hand placement portion 40.

Figure 9:
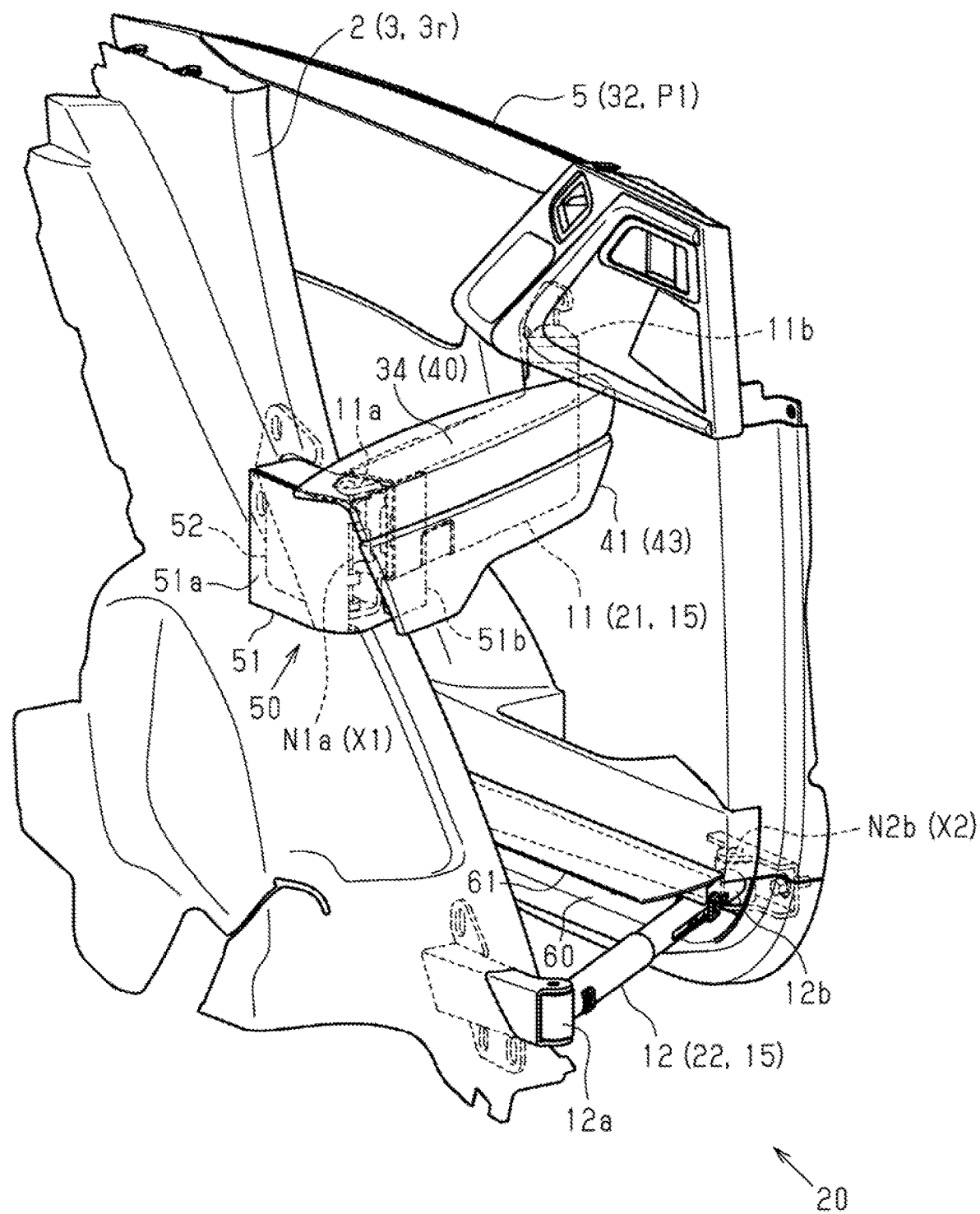
FIG. 9 is a perspective view in a case where the door is in a full opened state.
Figure 10:
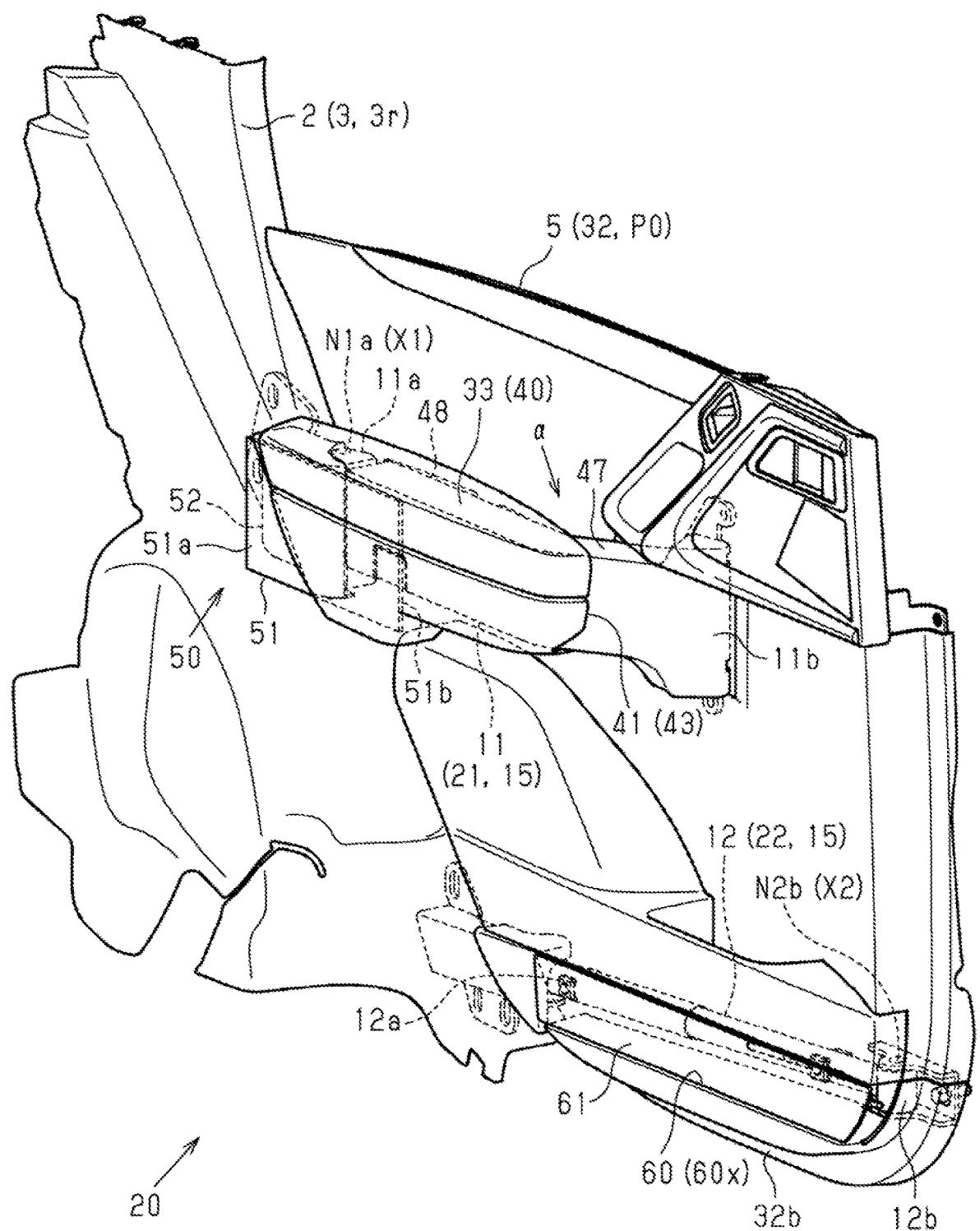
FIG. 10 is a perspective view in a case where the door is in a full closed state.
Figure 11:
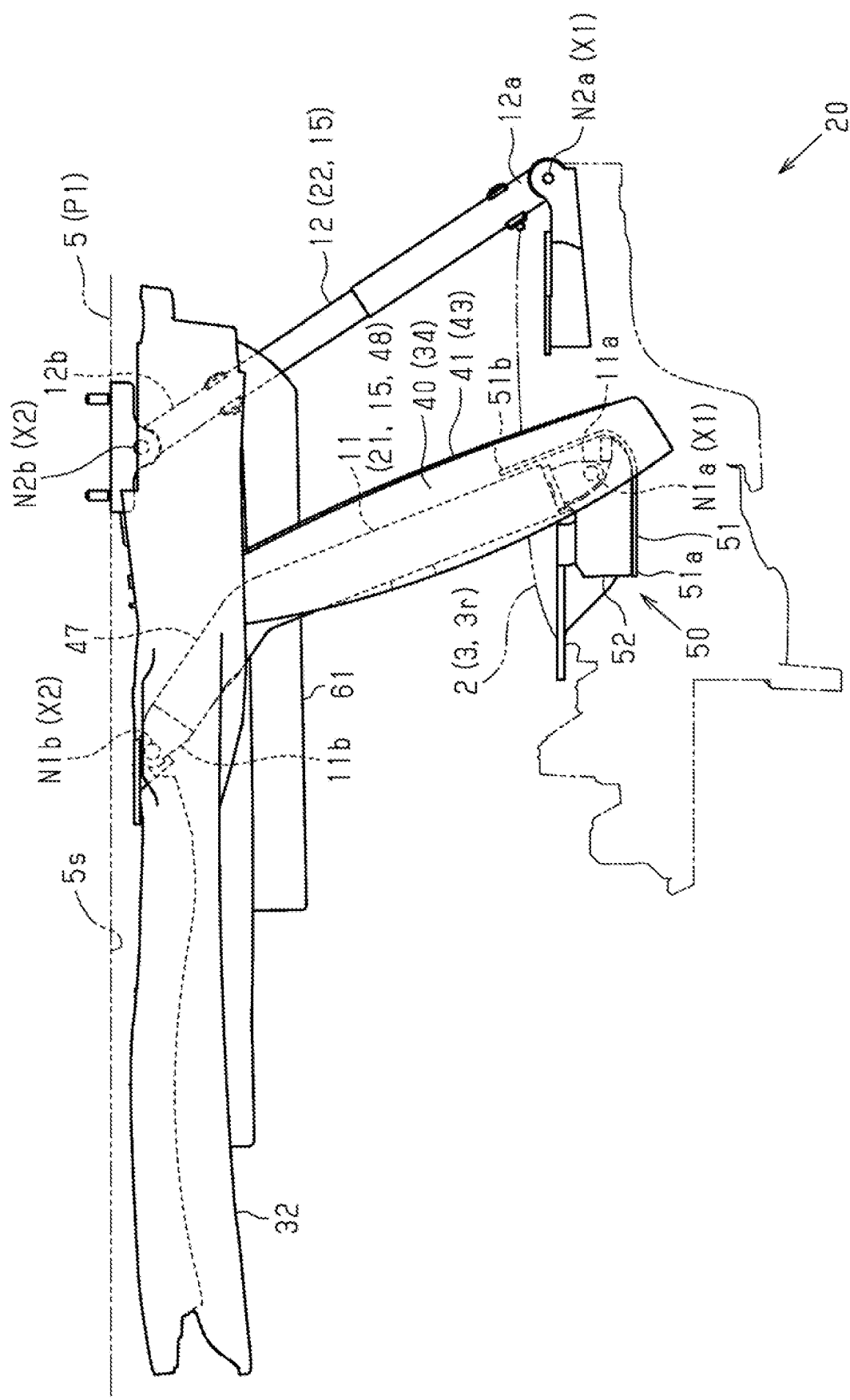
FIG. 11 is a plan view in a case where the door is in a full opened state.
Figure 12:
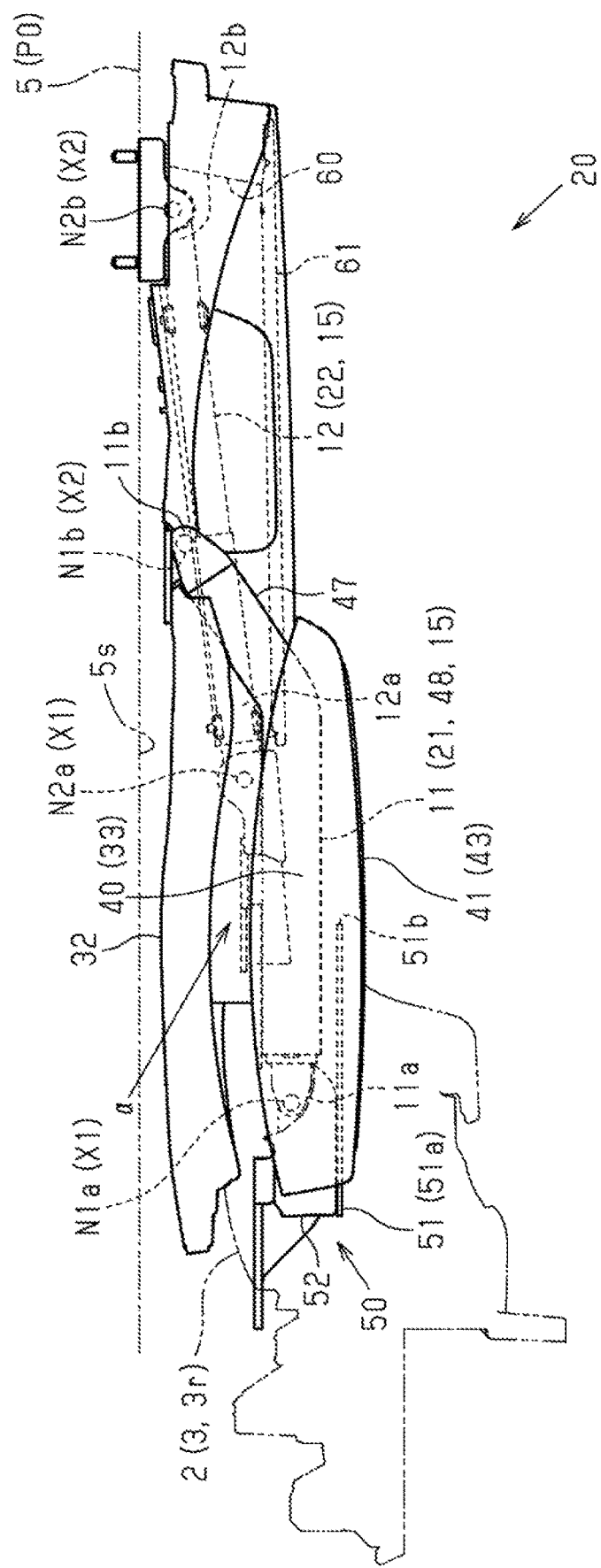
FIG. 12 is a plan view in a case where the door is in a full closed state.

Moreover, as illustrated in FIGS. 9 and 10, the vehicular door device 20 according to the present embodiment includes a coupling portion cover 51 covering a coupling portion 50 of the first link arm 11 with respect to the vehicle body 2. To be specific, the vehicular door device 20 according to the present embodiment includes, at the rear edge 3r of the door opening 3, a coupling member 52 fixed to the vehicle body 2. Moreover, the support shaft N1a extending in an up-down direction is provided in the coupling member 52. Further, the first link arm 11 has a proximal portion 11a coupled to the coupling member 52 in a state where rotation around the support shaft N1a is permitted. Then, the coupling portion cover 51 according to the present embodiment has a configuration that covers the coupling member 52 serving as the coupling portion 50 and the proximal portion 11a of the first link arm 11 on an outer side of a diametrical direction of the support shaft N1a configuring the first rotary coupling point X1 with respect to the vehicle body 2.

To describe specifically, as illustrated in FIGS. 15 to 18, the coupling portion cover 51 according to the present embodiment has, for example, a sheet-like outer shape made of a soft material such as resin or a leather material having flexibility in a thickness direction. Moreover, the coupling portion cover 51 includes, beside the coupling member 52, a fixed end 51a fixed to the vehicle body 2 together with the coupling member 52. Then, the coupling portion cover 51 according to the present embodiment includes a free end 51b inserted to inside of the first link cover 41 via an opening 54 provided in the first link cover 41 covering the first link arm 11.

To be specific, in the vehicular door device 20 according to the present embodiment, the first link cover 41 has a clearance $\beta$ between the inner cover 42 and the outer cover 43. Further, in the first link cover 41, the clearance $\beta$ forms the opening 54 facing the proximal portion 11a side of the first link arm 11. Then, the coupling portion cover 51 according to the present embodiment is configured to have the free end 51b inserted to inside of the first link cover 41 via the opening 54, and thereby cover the coupling portion 50 with respect to the vehicle body 2 in such a way as to continue to the first link cover 41.

Figure 17:
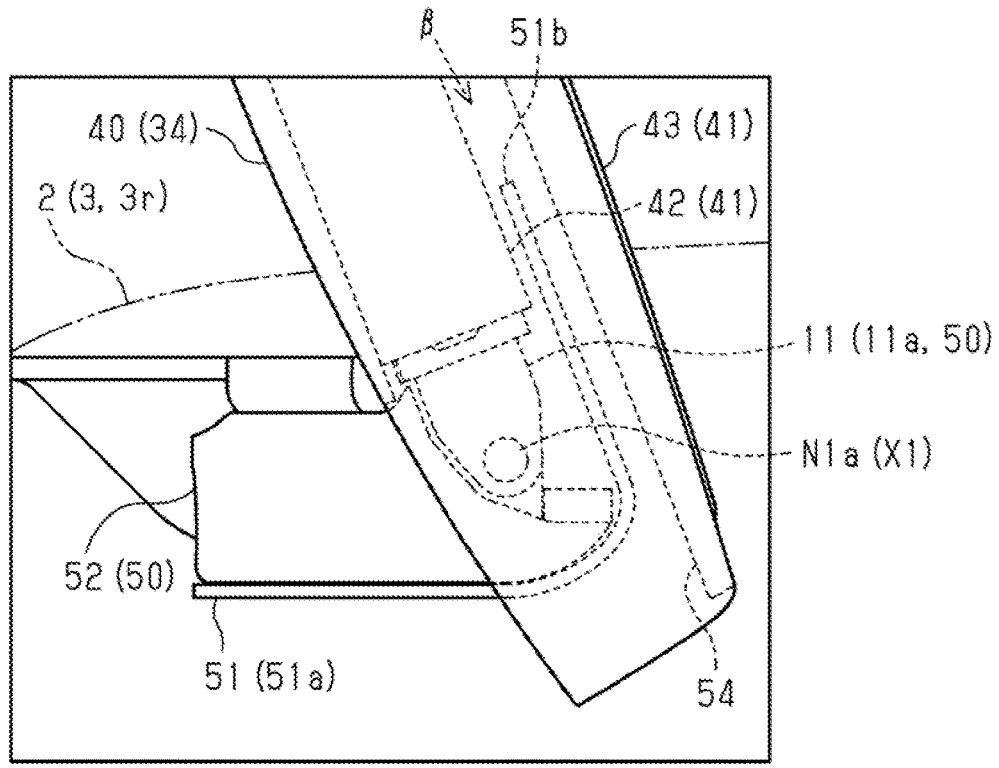
FIG. 17 is an operation explanatory view of the coupling portion cover.
Figure 18:
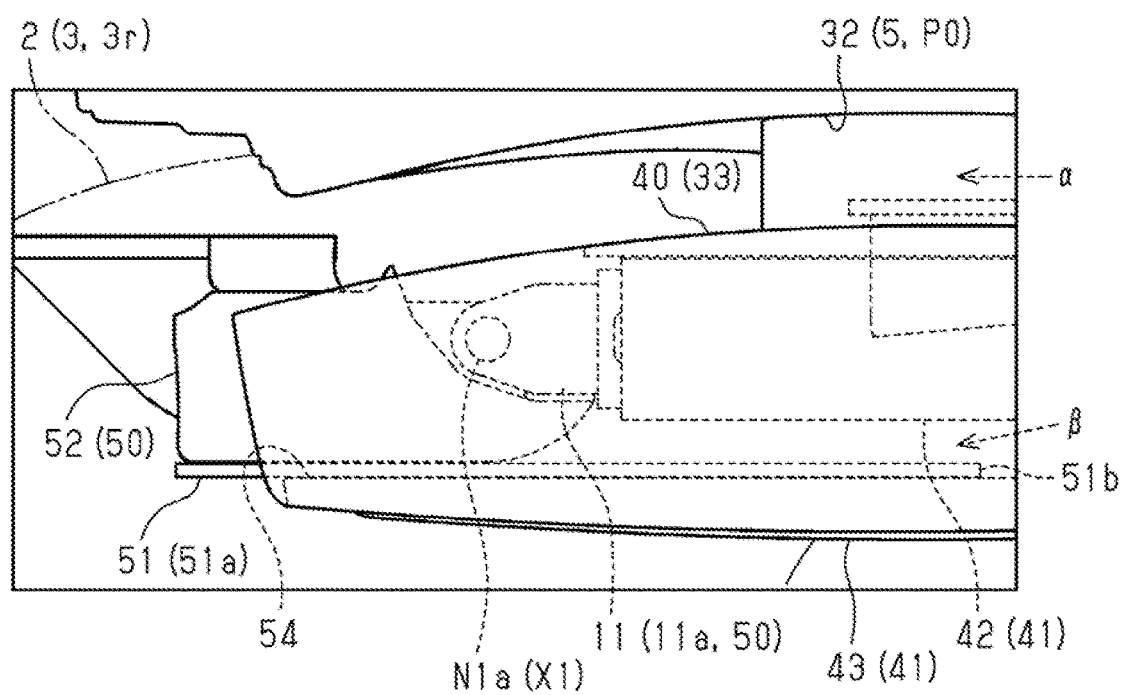
FIG. 18 is an operation explanatory view of the coupling portion cover.
Figure 19:
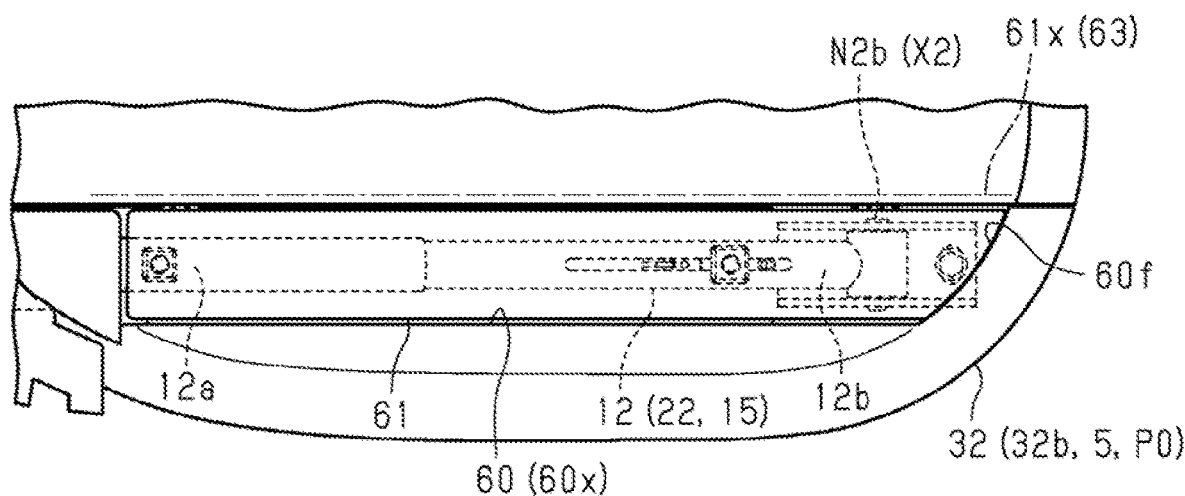
FIG. 19 is a front view of a storage recessed portion storing the second link arm, and a lid member covering an opening of the storage recessed portion.

That is to say, in the vehicular door device 20 according to the present embodiment, the first link arm 11 rotates around the support shaft N1a configuring the first rotary coupling point X1 with respect to the vehicle body 2, in a counterclockwise direction in FIGS. 17 and 18, and thereby the door 5 performs an opening operation. In this instance, in the coupling portion cover 51 according to the present embodiment, the free end 51b inserted to inside of the first link cover 41 via the opening 54 slides in the first link cover 41 toward the proximal portion 11a side of the first link arm 11, with deformation in a thickness direction. Then, the vehicular door device 20 according to the present embodiment thereby has a configuration in which the coupling portion cover 51 is partly drawn from inside of the first link cover 41, and a state where the coupling portion cover 51 continues to the first link cover 41 is maintained accordingly.

Moreover, in the vehicular door device 20 according to the present embodiment, the first link arm 11 rotates around the support shaft N1a configuring the first rotary coupling point X1 with respect to the vehicle body 2, in a clockwise direction in FIGS. 17 and 18, and thereby the door 5 performs a closing operation. In this case as well, in the coupling portion cover 51 according to the present embodiment, the free end 51b inserted to inside of the coupling portion cover 51 via the opening 54 slides in the coupling portion cover 51 toward the tip portion 11b side of the first link arm 11, with deformation in a thickness direction. Then, the vehicular door device 20 according to the present embodiment thereby has a configuration in which length of the coupling portion cover 51 that is inserted into the first link cover 41 is increased, and a state where the coupling portion cover 51 continues to the first link cover 41 without loosening is maintained accordingly.

To describe more specifically, as illustrated in FIGS. 9, 10, 14, and 19, in the vehicle 1 according to the present embodiment, the door trim 32 is provided with a storage recessed portion 60 that stores the second link arm 12 inside by a closing operation performed by the door 5. Then, the vehicular door device 20 according to the present embodiment includes a lid member 61 covering an opening 60x of the storage recessed portion 60 in conjunction with the closing operation of the door 5.

To be specific, the storage recessed portion 60 according to the present embodiment has a groove shape extending in a vehicle front-rear direction in the vicinity of a lower end portion 32b of the door trim 32. Moreover, a front end portion 60f of the storage recessed portion 60 is provided with a hole portion 62 for coupling a tip portion 12b of the second link arm 12 to the door 5. Further, the second link arm 12 rotates around the second rotary coupling point X2 with respect to the door 5, i.e., the support shaft N2b pivotally supporting the tip portion 12b, due to an opening-closing operation of the door 5. Then, the vehicular door device 20 according to the present embodiment thereby has a configuration in which relative positions of a proximal portion 12a of the second link arm 12 coupled to the vehicle body 2 and the lower end portion 32b of the door trim 32 provided with the storage recessed portion 60 change in a vehicle width direction.

That is to say, in the vehicular door device 20 according to the present embodiment, the second link arm 12 is, when the door 5 is in a full closed state, stored in the storage recessed portion 60 in a state of being along a groove shape of the storage recessed portion 60 extending in a vehicle front-rear direction. Then, the vehicular door device 20 according to the present embodiment has a configuration in which the second link arm 12 rotates due to an opening operation of the door 5, and thereby the second link arm 12 gradually separates to outside of the storage recessed portion 60 from the proximal portion 12a side.

Moreover, in the vehicular door device 20 according to the present embodiment, the lid member 61 has a substantially flat outer shape that is substantially equal to an opening shape of the storage recessed portion 60. Further, the lid member 61 includes a rotation axis 61x set above the storage recessed portion 60. Then, the lid member 61 according to the present embodiment rotates around the rotation axis 61x, and thereby has a configuration that opens or closes an opening 60x of the storage recessed portion 60 facing an inner side of a vehicle width direction (in FIG. 19, a near side of a sheet surface).

Figure 20:
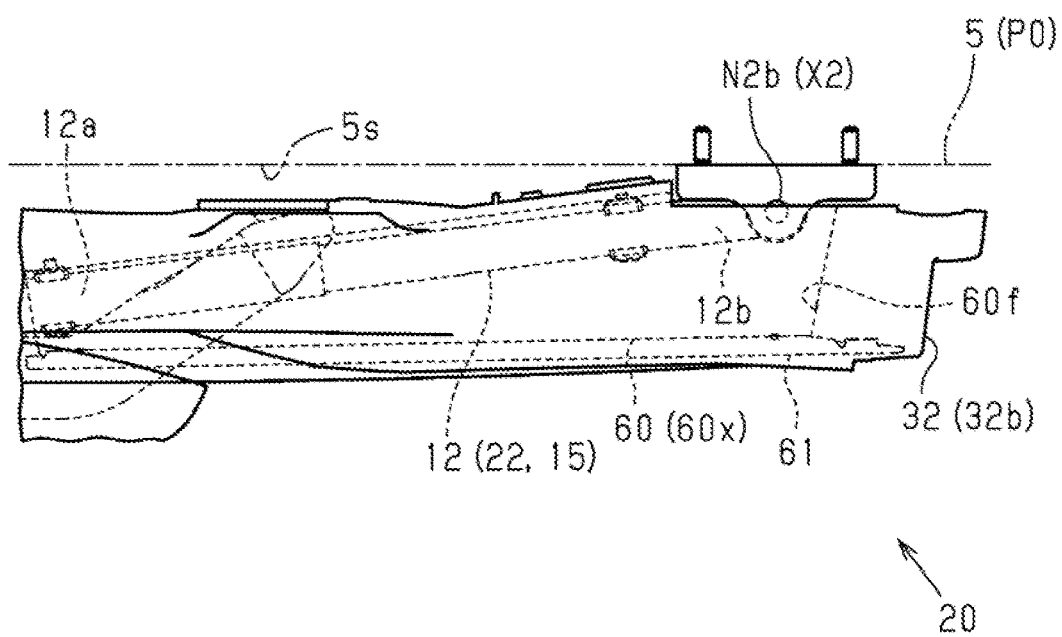
FIG. 20 is an operation explanatory view of the lid member.
Figure 21:
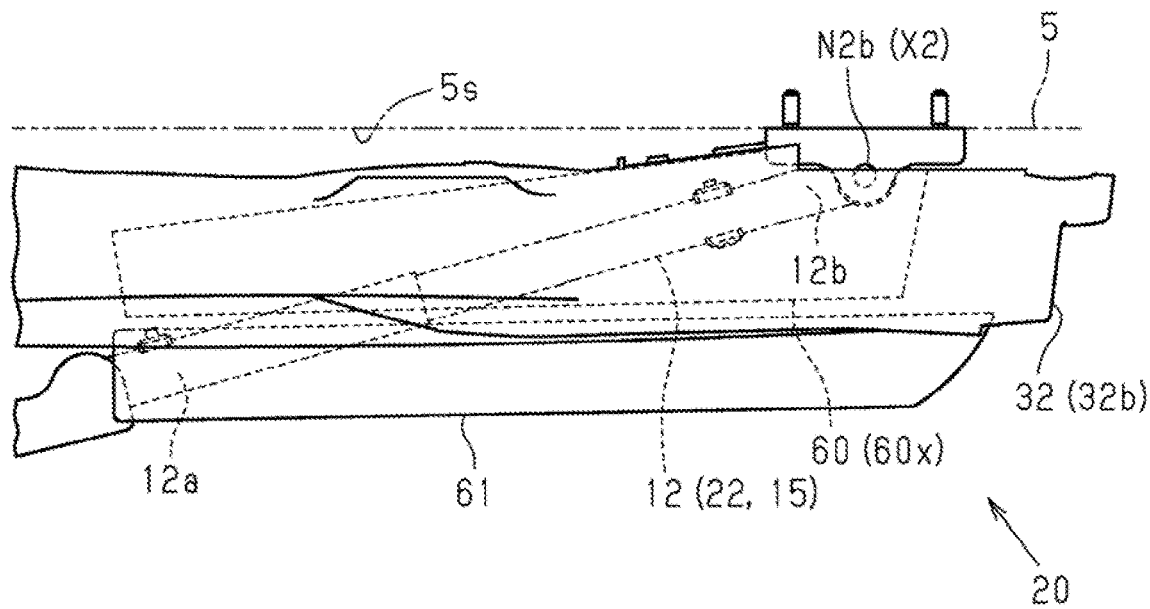
FIG. 21 is an operation explanatory view of the lid member.
Figure 22:
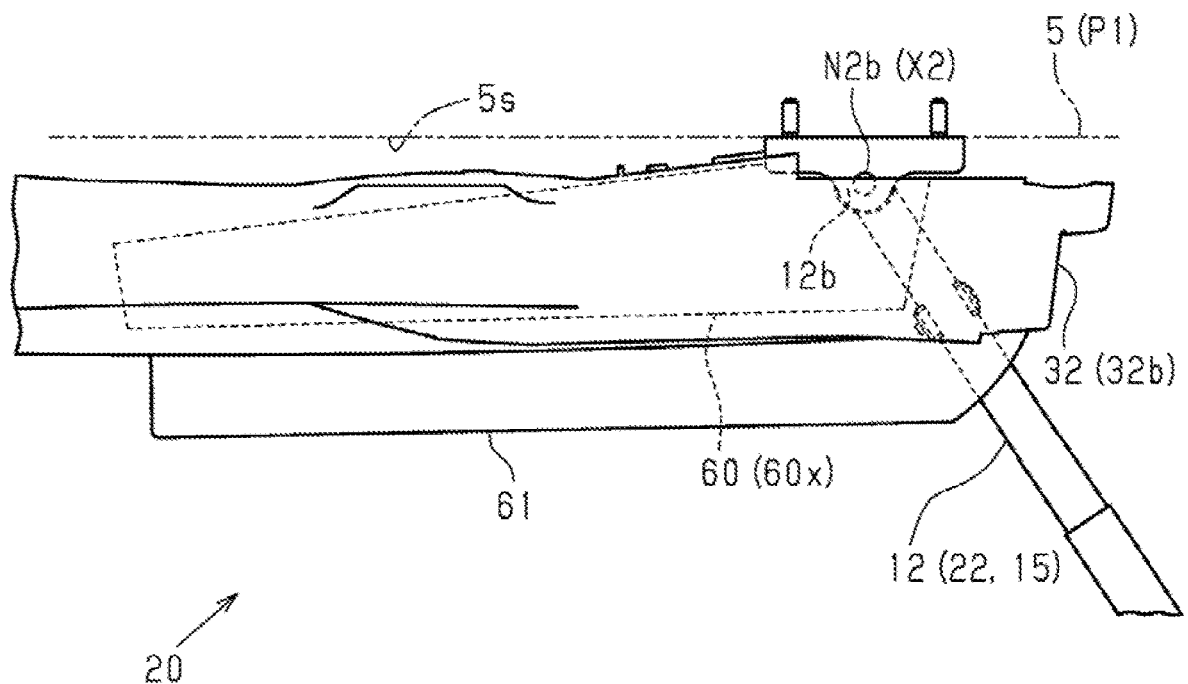
FIG. 22 is an operation explanatory view of the lid member.

That is to say, as illustrated in FIGS. 20 to 22, in the vehicular door device 20 according to the present embodiment, the door 5 performs an opening operation from a full closed state, and thereby the second link arm 12 stored in the storage recessed portion 60 presses, from inside, the lid member 61 covering an opening 60x. Moreover, the lid member 61 thereby rotates around the rotation axis 61x. Then, the vehicular door device 20 according to the present embodiment thereby has a configuration in which the lid member 61 performs an opening operation in such a way that the proximal portion 12a is pushed up by the second link arm 12 rotating in a direction to separate from the door trim 32.

Moreover, in the vehicular door device 20 according to the present embodiment, the second link arm 12 is stored in the storage recessed portion 60 due to a closing operation of the door 5, and thereby the lid member 61 rotates in a direction in which a tip lowers around the rotation axis 61x. Then, the vehicular door device 20 according to the present embodiment is thereby configured in such a way that the lid member 61 is brought into a closing state of covering the opening 60x of the storage recessed portion 60 in conjunction with the closing operation of the door 5, when the door 5 is in a full closed state.

Note that the vehicular door device 20 according to the present embodiment includes a resilient member 63 that biases the lid member 61 in a direction in which the tip lowers around the rotation axis 61x, i.e., in a direction in which a closing operation is performed. That is to say, in the vehicular door device 20 according to the present embodiment, the lid member 61 shifts into a closing state of covering the opening 60x, based on biasing force of the resilient member 63 in addition to own weight of the lid member 61. Then, the vehicular door device 20 according to the present embodiment further has a configuration that suppresses flapping of the lid member 61 rotating around the rotation axis 61x, based on biasing force of the resilient member 63.

Next, effects of the present embodiment are described.

That is to say, in the vehicular door device 20 according to the present embodiment, when the door 5 is in a full closed state, the hand placement portion 40 provided in the first link arm 11 is brought into a state of extending in a vehicle front-rear direction along the door trim 32. Then, the hand placement portion 40 provided in the first link arm 11 protruding from the inner side surface 5s of the door 5 thereby configures the armrest 33 that can be utilized by the passenger 35 on the seat 31 located beside the door 5.

Moreover, the hand placement portion 40 rotates integrally with the first link arm 11 in conjunction with an opening operation of the door 5, and is thereby brought into a state of extending in a vehicle width direction. Then, the hand placement portion 40 thereby configures the handrail portion 34 that can be utilized by the passenger 35 on the vehicle 1 who gets on and off from the door opening 3 in which the door 5 is provided.

Next, effects according to the present embodiment are described.

(1) The vehicular door device 20 includes the first and second link arms 11 and 12 having the first rotary coupling point X1 with respect to the vehicle body 2, and the second rotary coupling point X2 with respect to the door 5 of the vehicle 1. Moreover, the vehicular door device 20 causes the door 5 to perform an opening-closing operation, based on an operation of the link mechanism 15 formed of the first and second link arms 11 and 12. Further, the first link arm 11 is provided with the hand placement portion 40 that rotates integrally with the first link arm 11. Then, the vehicular door device 20 is configured in such a way that the first link arm 11 supports a load applied to the hand placement portion 40.

According to the configuration described above, the first link arm 11 can support a load applied to the hand placement portion 40 by the passenger 35 on the vehicle 1 in such a way as to put on a hand. Then, the first link arm 11 protruding from the inner side surface 5s of the door 5 can be thereby utilized effectively.

(2) When the door 5 is in a full closed state, the hand placement portion 40 configures the armrest 33 extending in a vehicle front-rear direction along the door trim 32. Then, the hand placement portion 40 configures the handrail portion 34 that rotates integrally with the first link arm 11 and extends in a vehicle width direction, by an opening operation performed by the door 5.

According to the configuration described above, for example, the passenger on the seat 31 located beside the door 5 can take a relaxed seated posture in such a way as to lean on the hand placement portion 40 configuring the armrest 33. Moreover, the passenger 35 on the vehicle 1 who utilizes the door opening 3 holds on to the hand placement portion 40 as the handrail portion 34 extending in a movement direction of the passenger 35, and can thereby get on and off easily. Then, improvement of convenience can be thereby made. Further, the hand placement portion 40 as the armrest 33 is disposed along the door trim 32, and integrality with the door 5 can be thereby improved. Then, improvement of designability can be thereby made.

(3) The first link arm 11 has a bent shape in which a tip part coupled to the door 5 is curved in such a way that a clearance is formed between the first link arm 11 and the door trim 32 when the door 5 is in a full closed state.

According to the configuration described above, sandwiching does not easily occur between the first link arm 11 and the door trim 32 that change in a separation distance therebetween due to an opening-closing operation of the door 5. Particularly, at a position nearer the tip portion 11*b* of the first link arm 11 coupled to the door 5, a separation distance between the tip portion 11*b* and the door trim 32 more easily becomes smaller during a closing operation of the door 5. However, by providing the first link arm 11 with a bent shape in which a tip part is curved, sandwiching between the first link arm 11 and the door trim 32 in the tip part can be effectively suppressed. Then, high safety can be thereby ensured.

(4) The vehicular door device 20 includes the first link cover 41 that rotates integrally with the first link arm 11 in a state of covering the first link arm. Then, the hand placement portion 40 is provided integrally with the first link cover 41. Thereby, improvement of designability can be made. In addition, the first link arm 11 can be protected.

(5) The vehicular door device 20 includes the coupling portion cover 51 that covers the coupling portion 50 of the first link arm 11 with respect to the vehicle body 2. The coupling portion cover 51 is formed by use of a soft material having flexibility. Moreover, the coupling portion cover 51 includes the fixed end 51*a* to the vehicle body 2. Then, the coupling portion cover 51 includes the free end 51*b* inserted to inside of the first link cover 41 via the opening 54 provided in the first link cover 41.

According to the configuration described above, the coupling portion 50 of the first link arm 11 with respect to the vehicle body 2 can be covered in such a way as to continue to the first link cover 41. Further, when the first link arm 11 rotates due to an opening-closing operation of the door 5, the free end 51*b* inserted to inside of the first link cover 41 slides in the first link cover 41. Then, with a simple configuration, a state can be thereby maintained where the coupling portion cover 51 covers, continuously to the first link cover 41, the coupling portion 50 of the first link arm 11 with respect to the vehicle body 2.

(6) The door trim 32 is provided with the storage recessed portion 60 that stores the second link arm 12 inside by a closing operation performed by the door 5. Then, the vehicular door device 20 includes the lid member 61 covering the opening 60*x* of the storage recessed portion 60 in conjunction with the closing operation of the door 5. Thereby, high designability can be ensured. In addition, the second link arm 12 can be protected.

Note that the embodiment described above can be modified and implemented as below.

The embodiment described above and the following modified examples can be implemented in combination with each other within a technically consistent scope.

In the embodiment described above, the hand placement portion 40 configures the armrest 33 extending in a vehicle front-rear direction along the door trim 32 when the door 5 is in a full closed state, and configures the handrail portion 34 that extends in a vehicle width direction, by an opening operation performed by the door 5. However, without being limited to this, the hand placement portion 40 may have a configuration including a function of either the armrest 33 or the handrail portion 34. Moreover, the first link arm 11 may be able to support a load applied to the hand placement portion 40 at any opening-closing operation of the door 5. Further, the seat 31 may not necessarily be disposed beside the door 5. Then, for example, an aspect of supporting a load applied to the hand placement portion 40 may be changed to any aspect, such as an aspect of configuring a handrail portion extending in a vehicle front-rear direction when the door 5 is in a full closed state.

In the embodiment described above, the first link cover 41 that rotates integrally with the first link arm 11 in a state of covering the first link arm is included. Moreover, the first link cover 41 includes the inner cover 42 fixedly attached to the outer periphery of the first link arm 11, and the outer cover 43 covering an outer side of the inner cover 42. Then, an upper cover 44 covering an upper side of the first link arm 11 functions as the hand placement portion 40, among components of the outer cover 43. However, without being limited to this, a shape of the first link cover 41 covering the first link arm 11 may be changed to any shape. Moreover, the first link cover 41 may have a configuration that partly covers the first link arm 11. Further, the hand placement portion 40 may have a configuration that is fixed to the first link arm 11 separately from the first link arm 11. Then, a configuration that does not include a cover member such as the first link cover 41 covering the first link arm may be embodied.

In the embodiment described above, the first link arm 11 provided with the hand placement portion 40 has a configuration as the main link 21 that can support a greater door load than the second link arm 12. However, without being limited to this, a configuration in which the first link arm 11 is the sub link 22 on which a relatively low acting door load acts may be embodied. Then, deposition of each of the first and second link arms 11 and 12 may also be changed to any deposition.

The storage recessed portion 60 of the second link arm 12 is provided in the door trim 32 in the embodiment described above, but may be configured to be provided in, for example, a body part of the door 5 in such a way as to be recessed in the inner side surface 5*s*.

Moreover, the lid member 61 covering the opening 60*x* of the storage recessed portion 60 has the rotation axis 61*x* above the storage recessed portion 60, and performs an opening-closing operation, but may be configured to have the rotation axis 61*x* below the storage recessed portion 60, and perform an opening-closing operation. Further, the lid member 61 may be configured by use of a soft material. Then, for example, an aspect in which the lid member 61 covers the opening 60*x* of the storage recessed portion 60 may be changed to any aspect, such as an aspect in which the second link arm 12 enters the storage recessed portion 60 via a slit extending in a longitudinal direction, and is removed from the storage recessed portion 60.

Figure 23:
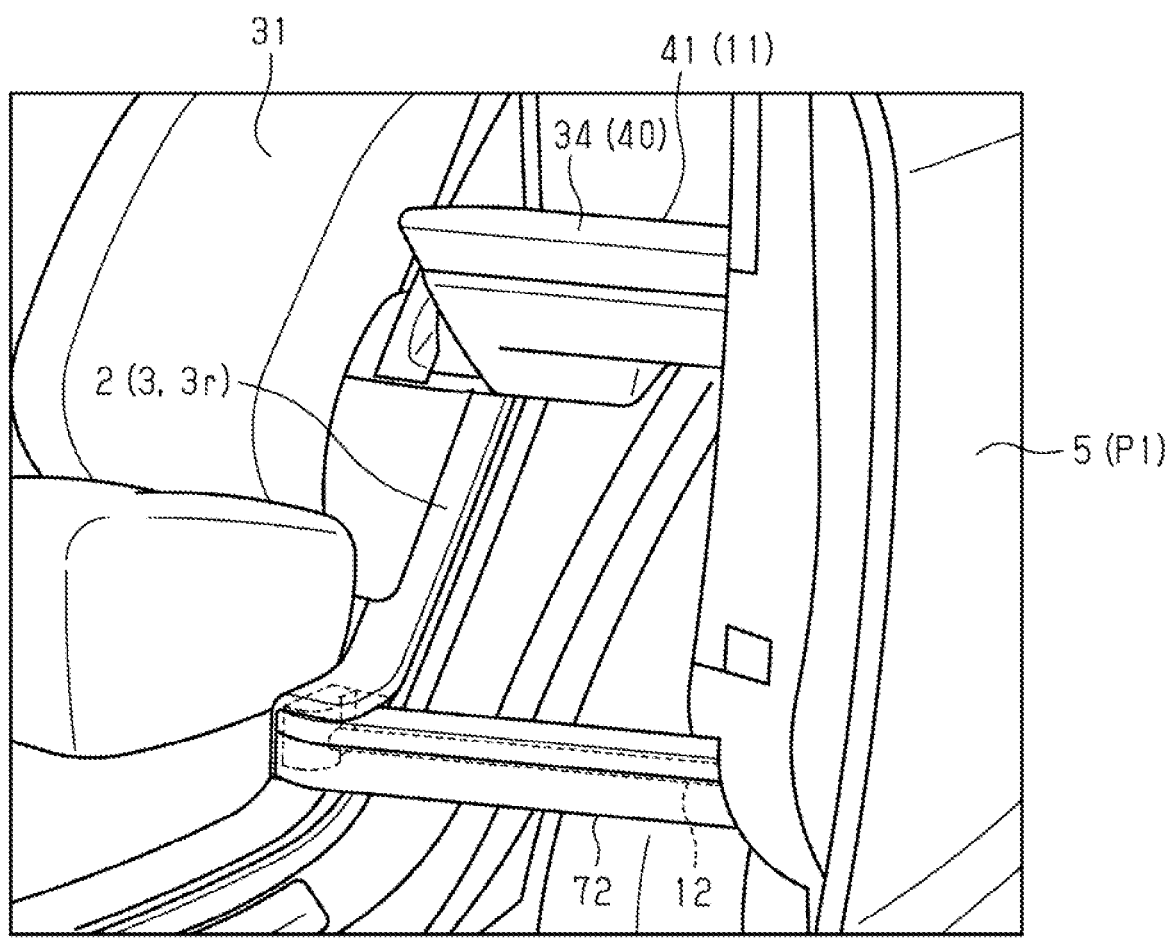
FIG. 23 is an explanatory view of a second link cover covering the second link arm.

Moreover, as illustrated in FIG. 23, a second link cover 72 that rotates integrally with the second link arm 12 may be configured to be included in a state of covering an outer periphery of the second link arm 12. Adopting such a configuration can further increase designability. Then, the second link arm 12 can be more effectively protected. Note that the second link cover 72 may also be configured to partly cover the second link arm 12.

This disclosure is applied to a configuration in which the door 5 of the vehicle 1 performs an opening operation on a vehicle rear side in the embodiment described above, but may be applied to a configuration in which the door 5 performs an opening operation on a vehicle front side. Then, this disclosure may be applied to a manual door device having no drive source such as the actuator 25.

A vehicular door device that solves the problem described above includes a first link arm and a second link arm that include a first rotary coupling point with respect to a vehicle body, and a second rotary coupling point with respect to a door of a vehicle. The door performs an opening-closing operation, based on an operation of a link mechanism formed of the first link arm and the second link arm. The first link arm is provided with a hand placement portion that rotates integrally with the first link arm, and is thereby configured in such a way as to support a load applied to the hand placement portion.

According to the configuration described above, the first link arm can support a load applied to the hand placement portion by a passenger on a vehicle in such a way as to put on a hand and the like. Then, the first link arm protruding from an inner side surface of the door can be thereby utilized effectively.

In the vehicular door device that solves the problem described above, the hand placement portion may configure an armrest extending in a vehicle front-rear direction along a door trim when the door is in a full closed state, and configure a handrail portion that rotates integrally with the first link arm and extends in a vehicle width direction, by an opening operation performed by the door.

According to the configuration described above, for example, a passenger on a seat located beside a door can take a relaxed seating posture in such a way as to lean on the hand placement portion configuring the armrest. Moreover, the passenger on a vehicle who utilizes a door opening holds on to the hand placement portion as the handrail portion extending in a movement direction of the passenger, and can thereby get on and off easily. Then, improvement of convenience can be thereby made. Further, the hand placement portion as the armrest is disposed along the door trim, and integrality with the door can be thereby improved. Then, improvement of designability can be thereby made.

In the vehicular door device that solves the problem described above, the first link arm may have a bent shape in which a tip part coupled to the door is curved in such a way that a clearance is formed between the first link arm and the door trim when the door is in a full closed state.

According to the configuration described above, sandwiching does not easily occur between the first link arm and the door trim that change in a separation distance therebetween due to an opening-closing operation of the door. Particularly, at a position nearer a tip portion of the first link arm coupled to the door, a separation distance between the tip portion and the door trim more easily becomes smaller during a closing operation of the door. However, by providing the first link arm with a bent shape in which a tip part is curved, sandwiching between the first link arm and the door trim in the tip part can be effectively suppressed. Then, high safety can be thereby ensured.

The vehicular door device that solves the problem described above may include a first link cover that rotates integrally with the first link arm in a state of covering the first link arm, and the hand placement portion may be provided integrally with the first link cover.

According to the configuration described above, improvement of designability can be made. In addition, the first link arm can be protected.

The vehicular door device that solves the problem described above may include a coupling portion cover having flexibility that includes a fixed end to the vehicle body, and a free end to be inserted to inside of the first link cover via an opening provided in the first link cover, and that covers a coupling portion of the first link arm with respect to the vehicle body.

According to the configuration described above, the coupling portion of the first link arm to the vehicle body can be covered in such a way as to continue to the first link cover. Further, when the first link arm rotates due to an opening-closing operation of the door, the free end inserted to inside of the first link cover slides in the first link cover. Then, with a simple configuration, a state is thereby maintained where the coupling portion cover covers, continuously to the first link cover, the coupling portion of the first link arm with respect to the vehicle body.

In the vehicular door device that solves the problem described above, the door may be provided with a storage recessed portion that stores the second link arm inside by a closing operation performed by the door, and the vehicular door device may further include a lid member covering an opening of the storage recessed portion in conjunction with a closing operation of the door.

According to the configuration described above, high designability can be ensured. In addition, the second link arm can be protected.

The vehicular door device that solves the problem described above may include a second link cover that rotates integrally with the second link arm in a state of covering the second link arm.

According to the configuration described above, designability thereof can be further increased. Then, the second link arm can be more effectively protected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A vehicular door device comprising:
 a first link arm and a second link arm that each include a first rotary coupling point with respect to a vehicle body, and a second rotary coupling point with respect to a door of a vehicle,
 wherein the door performs an opening-closing operation, based on an operation of a link mechanism formed of the first link arm and the second link arm, and
 wherein the first link arm is provided with a hand placement portion that rotates integrally with the first link arm, and is thereby configured in such a way as to support a load applied to the hand placement portion, and wherein when the door is in a full closed state, the first rotary coupling point of the first link arm and first rotary coupling point of the second link arm are positioned along a rear portion of the door with respect to a forward travel direction of the vehicle.

2. The vehicular door device according to claim 1, wherein
the hand placement portion configures an armrest extending in a vehicle front-rear direction along a door trim when the door is in the full closed state, and configures a handrail portion that rotates integrally with the first link arm and extends in a vehicle width direction, by an opening operation performed by the door.

3. The vehicular door device according to claim 2, wherein
the first link arm has a bent shape in which a tip part coupled to the door is curved in such a way that a clearance is formed between the first link arm and the door trim when the door is in the full closed state.

4. The vehicular door device according to claim 1, further comprising a first link cover that rotates integrally with the first link arm in a state of covering the first link arm, wherein
the hand placement portion is provided integrally with the first link cover.

5. The vehicular door device according to claim 4, further comprising a coupling portion cover having flexibility that includes a fixed end to the vehicle body, and a free end to be inserted to inside of the first link cover via an opening provided in the first link cover, and that covers a coupling portion of the first link arm with respect to the vehicle body.

6. The vehicular door device according to claim 1, wherein
the door is provided with a storage recessed portion that stores the second link arm inside by a closing operation performed by the door,
the vehicular door device further comprising a lid member covering an opening of the storage recessed portion in conjunction with a closing operation of the door.

7. The vehicular door device according to claim 1, further comprising a second link cover that rotates integrally with the second link arm in a state of covering the second link arm.

8. The vehicular door device according to claim 1, wherein a distance of a front-rear relationship between the second rotary coupling point of the second link arm and the first rotary coupling point and second rotary coupling point of the first link arm is:
in the full closed state of the door, the second rotary coupling point of the second link arm is closer to the second rotary coupling point of the first link arm than to the first rotary coupling point of the first link arm, and
in a full open state of the door, the second rotary coupling point of the second link arm is closer to the first rotary coupling point of the first arm than to the second rotary coupling point of the first link arm.

9. A vehicular door device comprising:
a first link arm and a second link arm that each include a first rotary coupling point with respect to a vehicle body, and a second rotary coupling point with respect to a door of a vehicle,
wherein the door performs an opening-closing operation, based on an operation of a link mechanism formed of the first link arm and the second link arm,
wherein the first link arm is provided with a hand placement portion that rotates integrally with the first link arm, and is thereby configured in such a way as to support a load applied to the hand placement portion, and
wherein the first link arm has a bent shape in which a tip part coupled to the door is curved in such a way that a clearance is formed between the first link arm and a door trim when the door is in a full closed state.

10. A vehicular door device comprising:
a first link arm and a second link arm that each include a first rotary coupling point with respect to a vehicle body, and a second rotary coupling point with respect to a door of a vehicle,
wherein the door performs an opening-closing operation, based on an operation of a link mechanism formed of the first link arm and the second link arm,
wherein the first link arm is provided with a hand placement portion that rotates integrally with the first link arm, and is thereby configured in such a way as to support a load applied to the hand placement portion,
the vehicle door device further comprising a first link cover that rotates integrally with the first link arm in a state of covering the first link arm, wherein the hand placement portion is provided integrally with the first link cover, and
the vehicle door device further comprising a coupling portion cover having flexibility that includes a fixed end to the vehicle body, and a free end to be inserted to inside of the first link cover via an opening provided in the first link cover, and that covers a coupling portion of the first link arm with respect to the vehicle body.

11. A vehicular door device comprising:
a first link arm and a second link arm that each include a first rotary coupling point with respect to a vehicle body, and a second rotary coupling point with respect to a door of a vehicle,
wherein the door performs an opening-closing operation, based on an operation of a link mechanism formed of the first link arm and the second link arm,
wherein the first link arm is provided with a hand placement portion that rotates integrally with the first link arm, and is thereby configured in such a way as to support a load applied to the hand placement portion,
wherein the door is provided with a storage recessed portion that stores the second link arm inside by a closing operation performed by the door, and
wherein the vehicular door device further comprising a lid member covering an opening of the storage recessed portion in conjunction with a closing operation of the door.

\* \* \* \* \*